United States Patent [19]

Hara et al.

[11] Patent Number: 5,498,492
[45] Date of Patent: Mar. 12, 1996

[54] LITHIUM SECONDARY BATTERY

[75] Inventors: Michikazu Hara; Asako Satoh; Norio Takami; Takahisa Ohsaki, all of Yokohama, Japan

[73] Assignee: Kabushiki Kaisha Toshiba, Kawasaki, Japan

[21] Appl. No.: 305,336

[22] Filed: Sep. 15, 1994

[30] Foreign Application Priority Data

Sep. 17, 1993 [JP] Japan ................................ 5-231282
Dec. 29, 1993 [JP] Japan ................................ 5-351325

[51] Int. Cl.$^6$ ................................................ H01M 04/60
[52] U.S. Cl. ........................ 429/212; 429/213; 429/194
[58] Field of Search ................................ 429/212, 213, 429/194

[56] References Cited

U.S. PATENT DOCUMENTS

| | | |
|---|---|---|
| 4,601,849 | 7/1986 | Yata et al. . |
| 4,615,960 | 10/1986 | Yata et al. . |
| 5,079,109 | 1/1992 | Takani et al. . |
| 5,162,176 | 11/1992 | Herr et al. ................................ 429/194 |
| 5,169,736 | 12/1992 | Bittihn et al. ............................ 429/194 |
| 5,187,035 | 2/1993 | Miyabayashi et al. ................... 429/194 |
| 5,196,279 | 3/1993 | Tarascon .................................. 429/194 |
| 5,272,022 | 12/1993 | Takani et al. . |
| 5,340,670 | 8/1994 | Takami et al. ........................... 429/194 |
| 5,370,949 | 12/1994 | Davidson et al. ....................... 429/224 |

OTHER PUBLICATIONS

Fong et al. "Studies of Lithium Intercalation into Carbon Using Nonaqueous Electrochemical Cells," J. Electrochem. Soc., 137(7) 1990, 2009.

Sax et al., *Hawley's Condensed Chemical Dictionary* 11th edition Van Nostrand Reinhold, p. 576.
Allinger et al, *Organic Chemistry*, Worth Publishers, p. 248, pp. 948–949, 1972.
Peters et al., *Chemical Separations and Measurements*, W. B. Saunders, 1974, pp. 714 & 732.
Patent Abstracts of Japan, vol. 17, No. 214, (E–1357), Apr. 27, 1993, JP–4–351861, Dec. 7, 1992.
Bulletin of the Chemical Society of Japan, vol. 65, No. 4, pp. 1062–1066, Apr. 1992, IL–Ryon Jeon, et al., "A Rechargeable Battery Using Electrochemically–Doped Poly(3–Vinylperylene) as an Electrode Material".
"A Mechanism of Lithium Storage in Disordered Cardons" Science vol. 264, 22 Apr. 1994, pp. 556–558, Kehji Sato, et al.
"Structure and Properties of Deeply LI–Doped Polyacenic Semiconductor Materials Beyond C6Li Stage." Synthetic Matals, 62 (1994) 153–158, Shizukuni Yata, et al.

*Primary Examiner*—Prince Willis, Jr.
*Assistant Examiner*—Carol Chaney
*Attorney, Agent, or Firm*—Oblon, Spivak, McClelland, Maier & Neustadt

[57] ABSTRACT

A lithium secondary battery with a large capacity and a long cycle life is disclosed. This lithium secondary battery includes a case, a negative electrode accommodated in the case and containing a polymeric material which has been formed by heat-treating a polymer having a perynaphthalene structure as a main repeating unit in a non-oxidizing atmosphere at 500° to 1000° C. and which absorbs and desorbs lithium ions, a positive electrode accommodated in the case and so arranged as to oppose the negative electrode with a separator sandwiched between them, and a nonaqueous electrolyte contained in the case.

23 Claims, 3 Drawing Sheets

F I G. 1

F I G. 2    WAVE NUMBER    (cm$^{-1}$)

F I G. 3    WAVE NUMBER    (cm$^{-1}$)

LITHIUM SECONDARY BATTERY

BACKGROUND OF THE INVENTION

1. Field of the Invention

The present invention relates to a lithium secondary battery and, more particularly, to a lithium secondary battery in which the construction of a negative electrode is improved.

2. Description of the Related Art

Recently, nonaqueous electrolyte batteries using lithium as a negative electrode active material have attracted attention as high-energy-density batteries. Nonaqueous electrolyte primary batteries using, e.g., manganese dioxide ($MnO_2$), carbon fluoride [$(CF_2)_n$], and thionyl chloride ($SO_3Cl_2$) as a positive electrode active material have already been used extensively as power supplies of pocket calculators and watches and as backup batteries of memories.

In addition, with decreasing size and weight of various electronic devices such as VTRs and communication devices in recent years, demands have increasingly arisen for high-energy-density secondary batteries for use as power supplies of these devices. Therefore, the study of lithium secondary batteries using lithium as a negative electrode active material is being vigorously done.

More specifically, the study is being made on a lithium secondary battery using a negative electrode such as metal lithium; a nonaqueous electrolyte prepared by dissolving a lithium salt, such as $LiClO_4$, $LiBF_4$, or $LiAsF_6$, in a nonaqueous solvent, such as propylenecarbonate (PC), 1,2-dimethoxyethane (DME), γ-butylolactone (γ-BL), or tetrahydrofuran (THF), or an electrolyte, such as a lithium ion conductive solid electrolytic salt; and a positive electrode active material, such as a compound which causes a topochemical reaction with lithium, e.g., $TiS_2$, $MoS_2$, $V_2O_5$, $V_6O_{13}$, and $MnO_2$.

However, no such lithium secondary batteries as discussed above have been put into practical use. The major reasons for this are a low charge/discharge efficiency and a small number of times (a short cycle life) by which charge/discharge is possible. This is considered to be caused primarily by deterioration of lithium brought about by the reaction between the metal lithium of the negative electrode and the nonaqueous electrolyte. That is, lithium which has dissolved as lithium ions in a nonaqueous electrolyte during discharge reacts with the nonaqueous solvent of the electrolyte in precipitating on the surface of a lithium negative electrode during charge. This makes a portion of the surface of the negative electrode inert. Therefore, if the charge/discharge is repeatedly performed, lithium precipitates in a dendrite form or in the form of small spheres on the negative electrode surface and is eventually separated from the collector.

For this reason, there has been proposed a lithium secondary battery including a negative electrode containing a carbonaceous material, such as coke, a resin calcined body, carbon fiber, or thermally decomposed vapor-phase carbon, which absorbs and desorbs lithium ions. Since the negative electrode contains the carbonaceous material, this secondary battery can discourage the reaction between lithium ions and the solvent of an electrolyte occurring when the lithium ions precipitate on the surface of the negative electrode. This makes it possible to prevent a portion of the surface of the negative electrode from being rendered inert. Consequently, degradation in the negative electrode characteristics caused by dendrite precipitation can be reduced. However, since the negative electrode containing the carbonaceous material has only a small lithium ion absorption/desorption amount, its negative electrode specific capacity (unit; mAh/g or mAh/$cm^3$) is also small. Additionally, if the lithium ion absorption amount is increased, i.e., if the charge capacity is increased, the structure of the carbonaceous material deteriorates, or the solvent in a nonaqueous electrolyte decomposes. Furthermore, if the charge current is increased, the lithium ion absorption amount decreases, and metal lithium precipitates on the surface of the negative electrode. Therefore, the cycle life of a lithium secondary battery incorporating the above negative electrode is shortened.

On the other hand, it has been attempted recently to use a heat-treated material of a π-electron conjugated polymer, such as polyacene, as the material of the negative electrode of a lithium secondary battery. However, the capacity of a lithium secondary battery incorporating a negative electrode containing this material is low. In addition, the cycle life is shortened if the capacity is increased.

SUMMARY OF THE INVENTION

It is an object of the present invention to provide a lithium secondary battery with a large capacity and a long cycle life.

According to the present invention, there is provided a lithium secondary battery comprising:

a case;

a negative electrode accommodated in the case and containing a polymeric material which absorbs and desorbs lithium ions and which has been formed by heat-treating a polymer in a non-oxidizing atmosphere at 500° to 1000° C., the polymer having as a main repeating unit a perynaphthalene structure represented by formula (I) below:

wherein $R^1$ to $R^4$ may be the same or different and represent hydrogen, an alkyl group, a phenyl group, or a naphthyl group;

a positive electrode accommodated in the case and so arranged as to oppose the negative electrode with a separator sandwiched therebetween; and a nonaqueous electrolyte contained in the case.

In addition, the present invention provides a lithium secondary battery comprising:

a case;

a negative electrode accommodated in the case and containing a polymeric material which absorbs and desorbs lithium ions and which consists of a heat-treated material of a polymer having as a main repeating unit a perynaphthalene structure represented by formula (I) below:

wherein $R^1$ to $R^4$ may be the same or different and represent hydrogen, an alkyl group, a phenyl group, or a naphthyl group, and having one aromatic ring vibrational peak at 1500 to 1700 cm$^{-1}$ in infrared spectroscopy;

a positive electrode accommodated in the case and so arranged as to oppose the negative electrode with a separator sandwiched therebetween; and a nonaqueous electrolyte contained in the case.

The present invention also provides a lithium secondary battery comprising:

a case;

a negative electrode accommodated in the case and containing a polymeric material which absorbs and desorbs lithium ions and which consists of a polymer having a perynaphthalene structure represented by formula (II) below:

as a repeating unit in each of X and Y directions such that the repeating unit in the X direction is equal to or larger than the repeating unit in the Y direction;

a positive electrode accommodated in the case and so arranged as to oppose the negative electrode with a separator sandwiched therebetween; and a nonaqueous electrolyte contained in the case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A lithium secondary battery (e.g., a cylindrical lithium secondary battery) according to the present invention will be described in detail below with reference to FIG. 1.

Figure 1:
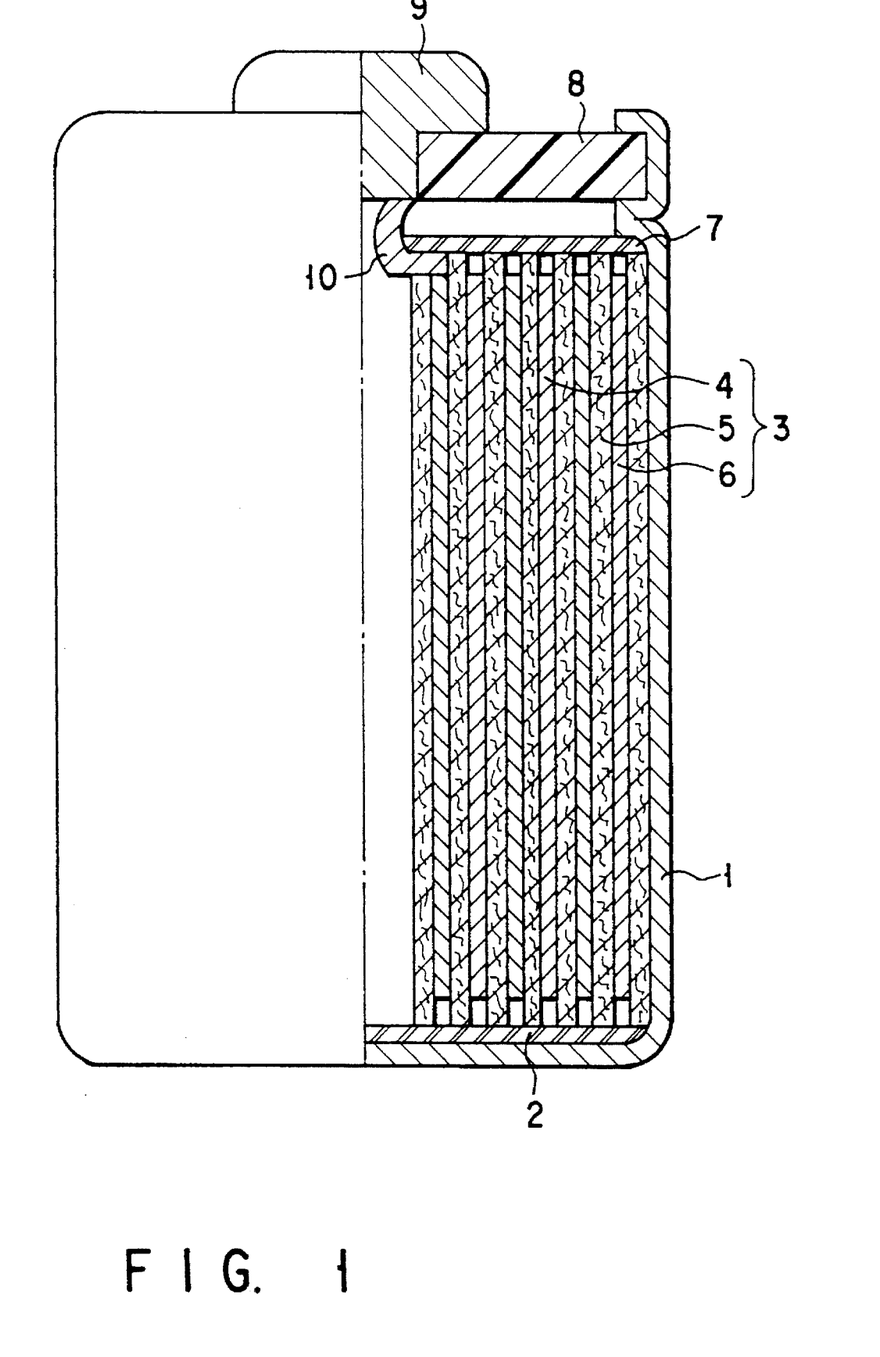
FIG. 1 is a partial sectional view showing a cylindrical lithium secondary battery according to the present invention.

Referring to FIG. 1, a closed-end cylindrical case 1 having a bottom houses an insulator 2 arranged on its bottom and electrode group 3. The electrode group 3 has a structure in which a band-like member obtained by stocking a positive electrode 4, a separator 5, and a negative electrode 6 in the order named is spirally wound so that the negative electrode 6 is positioned outside.

The case 1 contains a nonaqueous electrolyte. Insulating paper 7 having an opening formed in its central portion is placed in a portion of the case 1 above the electrode group 3. An insulating sealing plate 8 is arranged in the upper opening portion of the case 1. The sealing plate 8 is liquid-tightly fixed to the case 1 by caulking a portion near the upper opening portion inward. A positive terminal 9 is fitted in the center of the insulating sealing plate 8. One end of a positive lead 10 is connected to the positive electrode 4, and its other end is connected to the positive terminal 9. The negative electrode 6 is connected to the case 1 as a negative terminal via a negative lead (not shown).

The case 1 is made from, e.g., stainless steel.

The positive electrode 4 is formed by suspending a positive electrode active material, a conductive agent, and a binder in an appropriate solvent, coating the suspension on a collector, and drying the resultant structure to obtain a thin plate product.

Examples of the positive electrode active material are various oxides, such as manganese dioxide, lithium-manganese composite oxide, lithium-containing nickel oxide, a lithium-containing cobalt compound, lithium-containing nickel-cobalt oxide, and vanadium oxide containing lithium; and chalcogen compounds, such as titanium disulfide and molybdenum disulfide. The use of lithium-cobalt oxide ($LiCoO_2$), lithium-nickel oxide ($LiNiO_2$), and lithium-manganese oxide ($LiMn_2O_4$, $LiMnO_2$) of these dioxides and compounds is particularly preferred since a high voltage can be obtained.

Examples of the conductive agent are acetylene black, carbon black, and graphite.

Examples of the binder are polytetrafluoroethylene (PTFE), polyvinylidene fluoride (PVDE), an ethylene-propylene-diene copolymer (EPDM), and styrene-butadiene rubber (SBR).

Examples of the collector are an aluminum foil, a stainless steel foil, a nickel foil, a copper foil an expanded metal, and a metal mesh.

As the separator 5, it is possible to use, e.g., synthetic resin unwoven fabric, a polyethylene porous film, or a polypropylene porous film.

The negative electrode 6 contains each of polymeric materials (1) to (3) described below.

Polymeric material (1)

This polymeric material is obtained by heat-treating a polymer having a perynaphthalene structure represented by formula (I) presented earlier as its main repeating unit, in a non-oxidizing atmosphere at 500° to 1000° C. The non-oxidizing atmosphere means an inert gas (e.g., Ar, $N_2$) atmosphere or a vacuum atmosphere. This polymeric material preferably has one aromatic ring vibrational peak at 1500 to 1700 $cm^{-1}$ in infrared spectroscopy, and has a peak derived from aromatic ring at 100 to 150 ppm in a solid-state $C_{13}$NMR spectrum. The heat-treatment time is preferably from 30 minutes to 20 hours.

In this polymeric material, it is particularly preferable that all of $R^1$ to $R^4$ in formula (I) be hydrogen. A secondary battery including a negative electrode containing this polymeric material is improved in the capacity and the cycle characteristics.

The heat-treatment temperature at which this polymeric material is obtained is defined in the above range for the reasons explained below. If the heat-treatment temperature is less than 500° C., unreacted substances or impurities in the polymer remain in the resultant polymeric material. This results in a decrease in the capacity or the cycle life of a secondary battery including a negative electrode containing this polymeric material. If the heat-treatment temperature exceeds 1000° C., absorption of lithium ions by aromatic ring is degraded due to carbonization of the polymer. This leads to a decreased capacity of a secondary battery including a negative electrode containing this polymeric material. The heat-treatment temperature is more preferably 600° to 800° C.

The polymer having perynaphthalene structure represented by formula (I) presented earlier as its main repeating unit is obtained by condensing naphthalene or a compound having perylene structure represented by formula (III) below:

wherein $R^1$ to $R^4$ may be the same or different and represent hydrogen, an alkyl group, a phenyl group, or a naphthyl group.

Examples of the compound having perylene structure are perylene, 3,4,9,10-perylenetetracarboxylic dianhydride, naphthalene, naphthalene pitch which is obtained by condensing naphthalene, and derivative of these compound.

POLYMERIC MATERIAL (2)

This polymeric material is a heat-treated material of a polymer having a perynaphthalene structure repre-sented by formula (I) shown earlier as its main repeating unit. This polymeric material has one aromatic ring vibrational peak at 1500 to 1700 $cm^{-1}$ in infrared spectroscopy.

The polymeric material can be formed by heat-treating a polymer having a perynaphthalene structure represented by formula (I) as its main repeating unit in a non-oxdizing atmosphere at 500° to 1000° C. The heat-treatment temperature is more preferably 600° to 800° C. In addition, the heat-treatment time is preferably from 30 minutes to 20 hours.

The polymeric material preferably has a peak derived from aromatic ring at 100 to 150 ppm in a solid-state $C_{13}$NMR spectrum.

The polymeric material preferably has one aromatic ring vibrational peak with a half-width of 50 $cm^{-1}$ or more at 1500 to 1700 $cm^{-1}$ in infrared spectroscopy. When a large number of aromatic rings in a polymeric material are condensed, intensifying conjugation between aromatic rings, the half-width of aromatic ring vibrational peak at 1500 to 1700 $cm^{-1}$ becomes 50 $cm^{-1}$ or more. This means that the above polymeric material, in which the half-width of the aromatic ring vibrational peak is 50 $cm^{-1}$ or more, has intense conjugation between aromatic rings. Consequently, a secondary battery including a negative electrode containing this polymeric material is improved in the capacity and the cycle characteristics.

In the polymeric material, it is particularly preferable that all of $R^1$ to $R^4$ in formula (I) are preferably hydrogen, that two or three aromatic CH bending (out of plane) vibrational peaks exist at 700 to 950 $cm^{-1}$ in infrared spectroscopy, and that the element ratio (H/C) of hydrogen to carbon be 0.35 or less. A secondary battery including a negative electrode containing this polymeric material is improved in capacity and cycle characteristics. If the H/C exceeds 0.35 in this polymeric material, it becomes difficult to effectively improve the capacity and the cycle characteristics of a secondary battery including a negative electrode containing the polymeric material.

POLYMERIC MATERIAL (3)

This polymeric material is a polymer having a structure represented by formula (II) presented earlier as a repeating unit in each of the X and Y directions such that the repeating unit in the x direction is equal to or larger than the repeating unit in the Y direction.

The polymeric material having a structure of formula (II) as its repeating unit is obtained from the following precursors.

(a) A polymer having as its main repeating unit a perynaphthalene structure represented by formula (I) in which all of $R^1$ to $R^4$ are hydrogen.

(b) A dehydrogenation condensation product obtained by performing dehydrogenation condensation for an aromatic compound, such as naphthalene, anthracene, phenanthrene pyrene, picene, acenaphthylene, or naphthacene, or for an aromatic compound in pitch, such as an aromatic compound represented by formula (1) or (2) below, by heat-treating the compound in an inert gas atmosphere at 200° to 500° C.

-continued (2)

For example, when the dehydrogenation condensation is performed for naphthalene, a dehydrogenation condensation product (naphthalene pitch) represented by formula (3) below is formed. When the dehydrogenation condensation is performed for anthracene, a dehydrogenation condensation product (anthracene pitch) represented by formula (4) below is formed.

(3)

(4)

Dehydrogenation condensation as represented by reaction formula (A) below is caused by either heat-treating the precursor (a) or (b) in an inert gas atmosphere at a temperature from 600° C. to 800° C. (inclusive), or heating the precursor (a) or (b) in concentrated sulfuric acid at 50° to 200° C. The result is a polymeric material having a structure of formula (II) as its repeating unit in each of the X and Y directions such that the repeating unit in the X direction is equal to or larger than that the repeating unit the Y direction.

$-H_2$ (A)

The heat-treatment temperature in the inert gas atmosphere is defined in the above range for the reasons explained below. If the heat-treatment temperature is 600° C. or less, dehydrogenation condensation of aromatics or of the side chain of aromatic ring does not occur sufficiently. This decreases the capacity and the cycle life of a lithium secondary battery including a negative electrode containing this polymeric material. If the heat-treatment temperature exceeds 800° C., carbonization takes place to similarly lead to a decreased capacity.

The heat-treatment temperature in the concentrated sulfuric acid is defined for the reasons explained below. If the heat-treatment temperature is 50° C. or less, dehydrogenation condensation of aromatics or of the side chain of aromatics does not occur sufficiently. This decreases the capacity and the cycle life of a lithium secondary battery including a negative electrode containing this polymeric material. If the heat-treatment temperature exceeds 200° C., decomposition of aromatic ring takes place.

when the heat treatment is performed in the concentrated sulfuric acid, it is necessary to subsequently perform heating and deaeration in an inert atmosphere or in a vacuum at 400° to 800° C. The purpose of this treatment is to remove sulfuric acid remaining in the resultant polymer by thermal decomposition. If the heat-treatment temperature is less than 400° C., sulfuric acid cannot be sufficiently removed, resulting in a decrease in the capacity and the cycle life of a lithium secondary battery including a negative electrode containing this polymer. If the heat-treatment temperature exceeds 800° C., carbonization takes place to similarly lead to a decreased capacity. The heat-treatment temperature more preferably ranges between 500° and 700° C.

The above polymeric material preferably has a peak derived from aromatic ring at 100 to 150 ppm in a solid-state $C_{13}$NMR spectrum.

The polymeric material preferably has one aromatic ring vibration peak at 1500 to 1700 $cm^{-1}$ in infrared spectroscopy. In addition, the polymeric material preferably has aromatic ring vibrational peak with a halfwidth of 50 $cm^{-1}$ or more at 1500 to 1700 $cm^{-1}$ in infrared spectroscopy. When a large number of aromatic rings in a polymeric material are condensed, intensifying conjugation between aromatic rings, the half-width of an aromatic ring vibrational peak at 1500 to 1700 $cm^{-1}$ becomes 50 $cm^{-1}$ or more. This means that the above polymeric material, in which the half-width of the aromatic ring vibrational peak is 50 $cm^{-1}$ or more, has intense conjugation between aromatic rings. Consequently, a secondary battery including a negative electrode containing this polymeric material is improved in the capacity and the cycle characteristics.

The polymeric material preferably has two or three aromatic CH bending vibrational peaks at 700 to 950 $cm^{-1}$ in infrared spectroscopy. A secondary battery including a negative electrode containing this polymeric material is improved in the capacity and the cycle characteristics.

Each of the polymeric materials (1) to (3) discussed above preferably has a specific surface area of 500 $m^2/g$ or less as measured by a BET method. A negative electrode containing each of the polymeric materials having this specific surface area has a reduced reactivity with a nonaqueous electrolyte. Therefore, a secondary battery including this negative electrode is improved in the charge/discharge efficiency, the capacity, and the cycle characteristics. The specific surface area of the polymeric materials (1) to (3) is more preferably 1 to 150 $m^2/g$.

The density of each of the polymeric materials (1) to (3) is preferably 1.0 to 1.9 $g/cm^3$. In each of the polymeric materials having this density, lithium ions diffuse well. In addition, a negative electrode containing each of the polymeric materials having this density has a high packing density of each of the polymeric materials. Consequently, a secondary battery including this negative electrode has a large capacity and improved cycle characteristics. Note that a density exceeding 1.9 $g/cm^3$ interferes with diffusion of lithium ions in each of the polymeric materials. In this case, therefore, no improvements in the capacity and the cycle characteristics can be expected. If the density is less than 1.0 $g/cm^3$, on the other hand, the packing density of the negative electrode decreases, so the battery capacity cannot be expected to be improved.

It is preferable that each of the polymeric materials is contained in the negative electrode 6 in the form of particles or fibers. The mean particle size of the particles is preferably 3 to 100 μm. The mean diameter of the fibers is preferably 3 to 100 μm.

The negative electrode 6 is manufactured by mixing each of the polymeric materials (1) to (3) with a binder, and coating the resultant mixture on a collector.

Examples of the binder are polytetrafluoroethylene (PTFE), polyvinylidene fluoride (PVDF), an ethylene-propylene-diene copolymer (EPDM), styrene-butadiene rubber (SBR), and carboxymethylcellulose (CMC).

Examples of the collector are a copper foil, a stainless steel foil, and a nickel foil.

The nonaqueous electrolyte to be contained in the case 1 is prepared by dissolving an electrolytic salt in a nonaqueous solvent.

Examples of the nonaqueous solvent are ethylenecarbonate, propylenecarbonate, butylenecarbonate, dimethylcarbonate, diethylcarbonate, γ-butylolactone, sulforane, acetonitrile, 1,2-dimethoxyethane, 1,3-dimethoxypropane, diethylether, tetrahydrofuran, and 2-methyltetrahydrofuran. These nonaqueous solvents can be used either singly or in the form of a mixture of two or more types of them.

Examples of the electrolytic salt to be contained in the nonaqueous electrolyte are lithium salts such as lithium perchlorate ($LiClO_4$), lithium hexafluorophosphate ($LiPF_6$), lithium borofluoride ($LiBF_4$), lithium arsenic hexafluoride ($LiAsF_6$), lithium trifluoromethasulfonate ($LiCF_3SO_3$), and bistrifluoro-methylsulfonylimidolithium [$LiN(CF_3SO_2)_2$]. Of these lithium salts, $LiPF_6$, $LiBF_4$, and $LiN(CF_3SO_2)_2$ are preferably used. The use of $LiN(CF_3SO_2)_2$ is particularly preferred because it does not significantly react with the positive electrode active material at high temperatures (e.g., 60° C.), and consequently good charge/discharge cycle characteristics can be obtained at high temperatures. $LiN(CF_3SO_2)_2$ has another advantage of being able to improve the cycle life since it is stable with respect to each of the polymeric materials (1) to (3).

The dissolution amount of the electrolytic salt in the nonaqueous solvent is desirably 0.5 to 2.0 moles/l.

One lithium secondary battery according to the present invention discussed above includes a negative electrode containing the polymeric material (1) obtained by heat-treating a polymer having a perynaphthalene structure represented by formula (I) as a repeating unit, in a non-oxidizing atmosphere at 500° to 1000° C.

Another lithium secondary battery according to the present invention includes a negative electrode containing the polymeric material (2) which is a heat-treated material of a polymer having a perynaphthalene structure represented by formula (I) as a repeating unit and has one aromatic ring vibrational peak at 1500 to 1700 $cm^{-1}$ in infrared spectroscopy.

Still another lithium secondary battery according to the present invention includes a negative electrode containing the polymeric material (3) which is a polymer having a structure represented by formula (II) as a repeating unit in each of the X and Y directions such that the repeating unit in the X direction is equal to or larger than the repeating unit in the Y direction.

Each lithium secondary battery with the above arrangement has a large capacity and a long cycle life.

That is, a conventional carbonaceous material used in lithium secondary batteries has a graphite layered structure in which absorption and desorption of lithium ions are done by insertion and release between the graphite layers. For this reason, the absorption amount of lithium ions is stoichiometric: one lithium atom bonds to six carbon atoms ($LiC_6$) and no more lithium atoms attach. Therefore, if the carbonaceous material having the graphite layered structure is used as the negative electrode material for a lithium secondary battery, the capacity (mAh/g) of the negative electrode cannot exceed the theoretical critical value (372 mAh/g) of graphite.

Polyacetylene is generally known as the polymeric material which absorbs and desorbs ions. However, polyacethylene does not readily absorb cations such as Li ions and is weak against oxidation and reduction.

Naphthalene which is the main constituent of the polymeric material (1) or (2) used as the negative electrode material of the lithium secondary battery of the present invention forms a charge transfer complex together with lithium ions. That is, one naphthalene molecule combines with two lithium ions to form $C_{10}H_8^{2-}Li_2^{2+}$. This implies that one aromatic ring can bind to one lithium ion in conjugated aromatics, such as naphthalene, in which aromatic rings conjugate by contacting each other. Therefore, each of the polymeric materials (1) and (2) having a perynaphthalene structure can absorb at least three lithium ions per unit perynaphthalene ($C_{10}$). Consequently, the absorption amount of lithium ions can be increased significantly as compared with the conventional carbonaceous material.

In addition, the polymeric material (3) having a structure represented by formula (II) as a repeating unit in each of the X and Y directions forms a maximum of $C_2Li$ if one lithium ion is absorbed for one aromatic ring. That is, since a maximum of four lithium ions can be absorbed per unit ($C_8$), the absorption amount of lithium ions can be increased significantly compared to the conventional carbonaceous material.

Each of the polymeric material (1) to (3) discussed above has a conjugated π-electrons in the main chain and hence has a high electrical conductivity. Also, the structure is chemically stable since it consists primarily of aromatic rings.

Thus, the lithium secondary battery including a negative electrode containing each of the polymeric materials (1) to (3) has a large capacity greater than the theoretical capacity of graphite and a long cycle life.

When polyperynaphthalene represented by formula (I) in which all of $R^1$ to $R^4$ are hydrogen is heated in a non-oxdizing atmosphere at 600° C. or higher, dehydrogenation condensation as represented by reaction formula (A) presented earlier takes place between two or more polyperynaphthalene chains. This produces a polymeric material having a structure represented by formula (II) as a repeating unit in each of the x and Y directions, i.e., the polymeric material containing aromatic rings that are two-dimensionally dehydrocondensed.

A lithium secondary battery including a negative electrode containing this polymeric material can be stably charged and discharged reversibly with a large capacity.

In addition, each of the polymeric materials (1) and (2) is considered to have partially the structure of formula (II) as a repeating unit in each of the X and Y directions where some of $R^1$ to $R^4$ in formula (I) represent substituents other than hydrogen, or where these polymeric materials are obtained by heat-treating a polymer having a structure of formula (I) at less than 600° C. It follows that a lithium secondary battry comprising a negative electrode containing any of these polymeric materials (1) and (2) also permits improving its capacity and charge/discharge cycle life.

Generally, a carbon honeycomb structure is three-dimensionally formed when a readily graphitizable carbon material such as pitch is heated. Such a carbonaceous material is basically different in, e.g., the lithium ion absorption characteristics from the polymeric material represented by formula (II).

The present invention will be described in more detail below by way of its preferred examples with reference to FIG. 1 discussed earlier.

EXAMPLE 1

First, 80 wt % of a powder of lithium-cobalt oxide ($Li_xCoO_2$ ($0.8 \leq x \leq 1$)), 15 wt % of acetylene black, and 5 wt % of polytetrafluoroethylene were mixed and formed into a sheet. Thereafter, the sheet was pressed on a collector consisting of an expanded metal to manufacture a positive electrode.

Separately, a polymer having as repeating unit a perynaphthalene structure represented by formula (I) in which all of $R^1$ to $R^4$ are hydrogen was obtained by heating 3,4,9,10-perylenetetracarboxylic dianhydride in an argon flow at 530° C. for 12 hours. This polymer was heat-treated in an argon flow at 550° C. for five hours to yield a polymeric materials.

Figure 2:
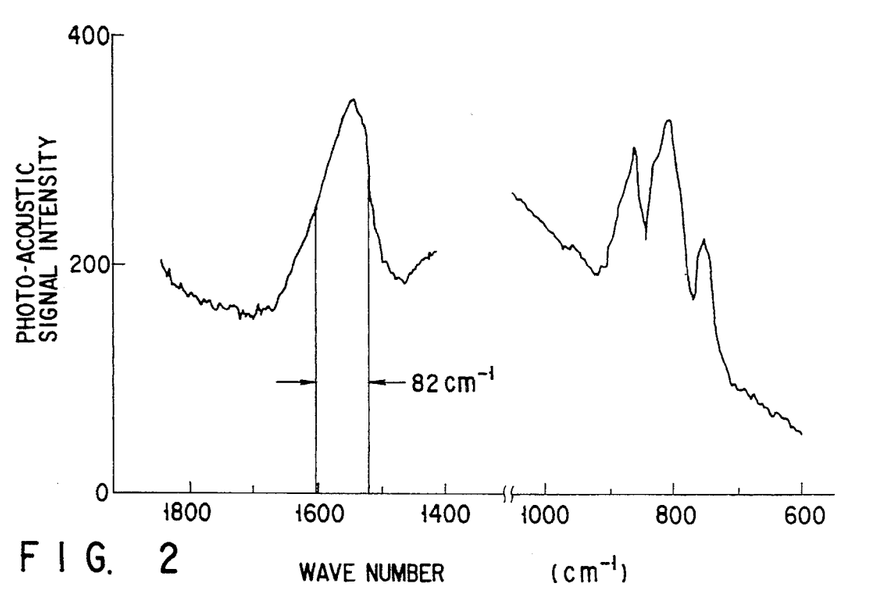
FIG. 2 is a graph showing the photo-acoustic spectrum of a polymeric material in Example 1 of the present invention.

The photo-acoustic spectrum of the obtained polymeric material was measured by infrared spectroscopy. Consequently, the photo-acoustic spectrum shown in FIG. 2 was obtained. In FIG. 2, the wave number ($cm^{-1}$) is plotted on the abscissa, and the photo-acoustic signal intensity is plotted on the ordinate. It was confirmed from FIG. 2 that the polymeric material had one aromatic ring vibrational peak with a half-width of 82 $cm^{-1}$ at 1500 to 1700 $cm^{-1}$ and three aromatic CH bending vibrational peaks at 720 to 910 $cm^{-1}$. It was also confirmed by $C_{13}$MAS (Magic Angle Spinning) NMR analysis based on silicon rubber that the polymeric material had a peak derived from aromatic ring carbon at 100 to 150 ppm. The polymeric material was found to have an element ratio (H/C) of hydrogen to carbon of 0.35 as measured by elemental analysis, a specific surface area of 18 $m^2/g$ as measured by a BET method, and a density of 1.3 $g/cm^3$. The polymeric material having these characteristics was milled to form particles with a mean particle size of 10 μm. 98 wt% of the particles and 2 wt % of an ethylenepropylene copolymer were mixed, and the resultant mixture was coated on a stainless steel foil as a collector and dried, thereby manufacturing a negative electrode.

The positive electrode, a separator constructed of a polyethylene porous film, and the negative electrode were laminated in this order. The laminated product was spirally wound such that the negative electrode was located outside, manufacturing an electrode group.

In addition, a nonaqueous electrolyte was prepared by dissolving 1.0 mole/l of lithium hexafluorophosphate ($LiPF_6$) in a solvent mixture (mixing volume ratio 25: 25: 50) of propylenecarbonate, ethylenecarbonate, and dimethoxyethane.

A cylindrical lithium secondary battery as illustrated in FIG. 1 was assembled by placing the electrode group and the electrolyte in a stainless-steel closed-end cylindrical case.

EXAMPLE 2

A polymer identical with that in Example 1 was heat-treated in an argon flow at 650° C. for five hours, yielding a polymeric material containing a dehydrogenation condensation product in which a condensation takes place between polyperynaphthalene chains.

Figure 3:
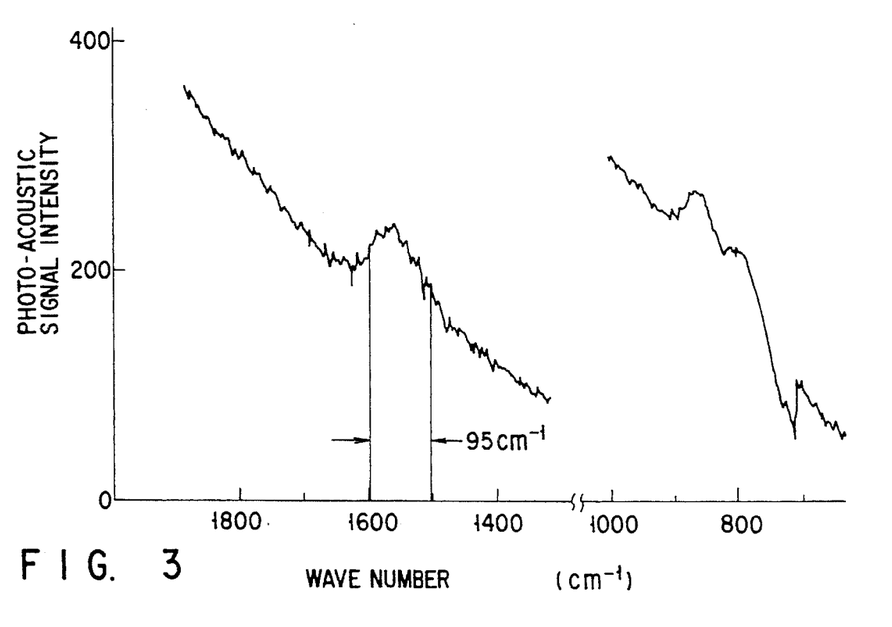
FIG. 3 is a graph showing the photo-acoustic spectrum of a polymeric material in Example 2 of the present invention.

The photo-acoustic spectrum of the obtained polymeric material was measured by infrared spectroscopy. Consequently, the photo-acoustic spectrum shown in FIG. 3 was obtained. It was confirmed from FIG. 3 that the polymeric material had one aromatic ring vibrational peak with a half-width of 95 $cm^{-1}$ at 1500 to 1700 $cm^{-1}$ and two aromatic CH bending vibrational peaks at 700 to 950 $cm^{-1}$. It was also confirmed by $C_{13}$MASNMR analysis that the polymeric material had a peak derived from aromatic ring at 110 to 140 ppm. The polymeric material was found to have an element ratio (H/C) of hydrogen to carbon of 0.16 as measured by elemental analysis, a specific surface area of 16 m²/g as measured by a BET method, and a density of 1.6 g/cm³.

Following the same procedures as in Example 1, a negative electrode was manufactured by using particles formed by milling the above polymeric material and having a mean particle size of 8 μm. A cylindrical lithium secondary battery as illustrated in FIG. 1 was assembled following the same procedures as in Example 1 except that this negative electrode was used.

EXAMPLE 3

A polymer identical with that in Example 1 was heat-treated in concentrated sulfuric acid (98 wt %) at 200° C. for three hours, separated by filtration, and washed with water until the pH of the filtrate became 5 to 6. Subsequently, deaeration was performed for the resultant material under vacuum at 550° C. for three hours, yielding a polymeric material.

Figure 4:
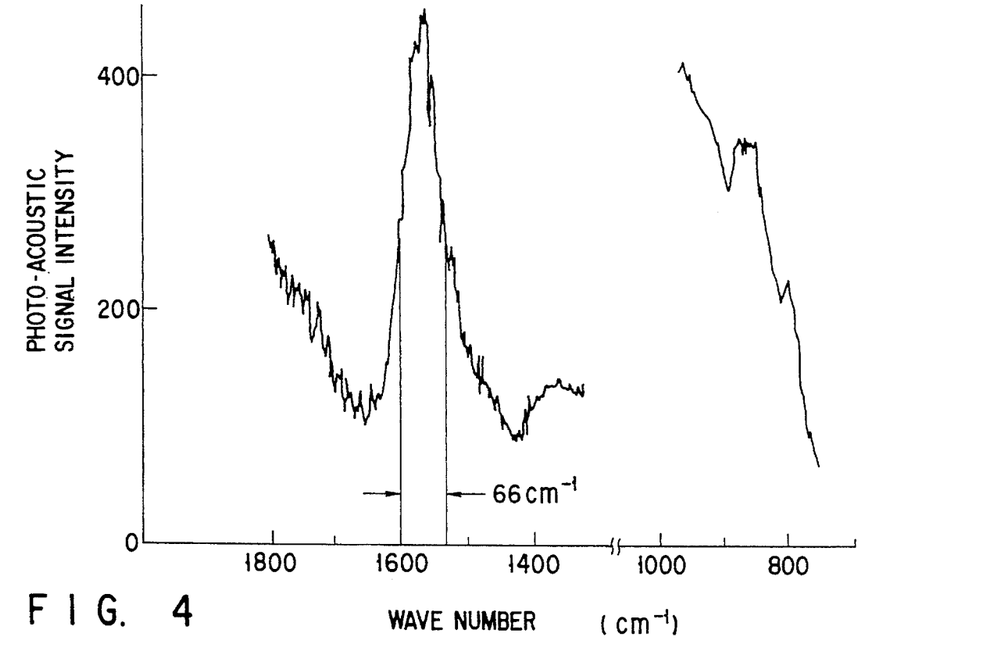
FIG. 4 is a graph showing the photo-acoustic spectrum of a polymeric material in Example 3 of the present invention.

The photo-acoustic spectrum of the obtained polymeric material was measured by infrared spectroscopy. Consequently, the photo-acoustic spectrum shown in FIG. 4 was obtained. It was confirmed from FIG. 4 that the polymeric material had one aromatic ring vibrational peak with a half-width of 66 cm⁻¹ at 1500 to 1700 cm⁻¹ and two aromatic CH bending vibrational peaks at 800 to 950 cm⁻¹. It was also confirmed by $C_{13}$MASNMR analysis that the polymeric material had a peak derived from aromatic ring at 100 to 150 ppm. Note that the position and shape of the peak found in the $C_{13}$MASNMR analysis were similar to those of Example 2. These analyses showed that the polymeric material was the dehydrogenation condensation product of polyperynaphthalene in Example 2. This dehydro-genation condensation product was also found to have an element ratio (H/C) of hydrogen to carbon of 0.10 as measured by elemental analysis, a specific surface area of 18 m²/g as measured by a BET method, and a density of 1.7 g/cm³.

Following the same procedures as in Example 1, a negative electrode was manufactured by using particles formed by milling the above polymeric material and having a mean particle size of 10 μm. A cylindrical lithium secondary battery as illustrated in FIG. 1 was assembled following the same procedures as in Example 1 except that this negative electrode was used.

EXAMPLE 4

First, a polymer was obtained by heat-treating naphthalene pitch in an argon flow at 500° C. for ten hours. This naphthalene pitch contained an organic substance represented by formula (5) below as its main component. The polymer was found by $C_{13}$NMR ¹HNMR, mean molecular weight and elemental analysis to have as its repeating unit a perinaphthalene structure having a naphthyl group as a substituent. Subsequently, the polymer was heat-treated in an argon flow at 700° C. for five hours to yield a polymeric material.

(5)

It was confirmed by infrared spectroscopy that the obtained polymeric material had one aromatic ring vibrational peak with a half-width of 83 cm⁻¹ at 1500 to 1700 cm⁻¹. Also, a peak derived from aromatic ring was detected at 100 to 150 ppm in the polymeric material by $C_{13}$MASNMR analysis. The shape of the peak was different from those in Examples 2 and 3. The polymeric material was also found to have an element ratio (H/C) of hydrogen to carbon of 0.05 as measured by elemental analysis, a specific surface area of 53 m²/g as measured by a BET method, and a density of 1.5 g/cm³.

Following the same procedures as in Example 1, a negative electrode was manufactured by using particles formed by milling the above polymeric material and having a mean particle size of 20 μm. A cylindrical lithium secondary battery as illustrated in FIG. 1 was assembled following the same procedures as in Example 1 except that this negative electrode was used.

EXAMPLE 5

Naphthalene pitch identical with that in Example 4 was heat-treated in an argon flow at 350° C. for ten hours. Thereafter, the resultant material was heat-treated in an argon flow at 600° C. for five hours, yielding a polymeric material.

The photo-acoustic spectrum of the obtained polymeric material was measured by infrared spectroscopy. Consequently, it was confirmed that the polymeric material had one aromatic ring vibrational peak with a half-width of 98 cm⁻¹ at 1500 to 1700 cm⁻¹ and two aromatic CH bending vibrational peaks at 700 to 950 cm⁻¹. Also, a peak derived from aromatic ring was detected at 100 to 150 ppm in the polymeric material by $C_{13}$MASNMR analysis. The position and shape of the peak were identical with those in Examples 2 and 3. These analyses showed that the polymeric material had the same structure in Examples 2 and 3. The polymeric material was also found to have an element ratio (H/C) of hydrogen to carbon of 0.12 as measured by elemental analysis, a specific surface area of 40 m²/g as measured by a BET method, and a density of 1.6 g/cm³.

Following the same procedures as in Example 1, a negative electrode was manufactured by using particles formed by milling the above polymeric material and having a mean particle size of 20 μm. A cylindrical lithium secondary battery as illustrated in FIG. 1 was assembled following the same procedures as in Example 1 except that this negative electrode was used.

EXAMPLE 6

Coal tar pitch having an organic substance represented by formula (6) below as an average molecular structure was heat-treated in an argon flow at 400° C. for ten hours. Thereafter, the resultant material was heat-treated in an argon flow at 650° C. for five hours, yielding a polymeric material.

(6)

The photo-acoustic spectrum of the obtained polymeric material was measured by infrared spectroscopy. Consequently, it was confirmed that the polymeric material had one aromatic ring vibrational peak with a half-width of 78 $cm^{-1}$ at 1500 to 1700 $cm^{-1}$ and two aromatic CH bending vibrational peaks at 700 to 900 $cm^{-1}$. Also, a peak derived from a benzene ring was detected at 100 to 150 ppm in the polymeric material by $C_{13}$MASNMR analysis. The position and shape of the peak were identical with those in Examples 2, 3, and 5. These analyses showed that the polymeric material had the same structure in Examples 2, 3, and 5. The polymeric material was also found to have an element ratio (H/C) of hydrogen to carbon of 0.18 as measured by elemental analysis, a specific surface area of 11 $m^2/g$ as measured by a BET method, and a density of 1.5 $g/cm^3$.

Following the same procedures as in Example 1, a negative electrode was manufactured by using particles formed by milling the above polymeric material and having a mean particle size of 20 μm. A cylindrical lithium secondary battery as illustrated in FIG. 1 was assembled following the same procedures as in Example 1 except that this negative electrode was used.

EXAMPLE 7

Coal tar pitch identical with that in Example 6 was heat-treated in an argon flow at 400° C. for ten hours. Thereafter, the resultant material was heat-treated in concentrated sulfuric acid (98 wt %) at 150° C. for three hours, and the solid product was separated by filtration. The obtained solid product was repeatedly washed with water until the pH of the filtrate became 5 to 6. Subsequently, deaeration was performed for the resultant material in a vacuum at 600° C. for five hours, yielding a polymeric material.

The photo-acoustic spectrum of the obtained polymeric material was measured by infrared spectroscopy. Consequently, it was confirmed that the polymeric material had one aromatic ring vibrational peak with a half-width of 121 $cm^{-1}$ at 1500 to 1700 $cm^{-1}$ and two aromatic CH bending vibrational peaks at 700 to 900 $cm^{-1}$. Also, a peak derived from aromatic ring was detected at 100 to 150 ppm in the polymeric material by $C_{13}$MASNMR analysis. The shape of the peak was identical with those in Examples 2, 3, 5, and 6. These analyses showed that the polymeric material had the same structure in Examples 2, 3, 5 and 6. The polymeric material was also found to have an element ratio (H/C) of hydrogen to carbon of 0.13 as measured by elemental analysis, a specific surface area of 32 $m^2/g$ as measured by a BET method, and a density of 1.7 $g/cm^3$.

Following the same procedures as in Example 1, a negative electrode was manufactured by using particles formed by milling the above polymeric material and having a mean particle size of 20 μm. A cylindrical lithium secondary battery as illustrated in FIG. 1 was assembled following the same procedures as in Example 1 except that this negative electrode was used.

Comparative Example 1

A polymeric material was obtained by heat-treating a polymer identical with that in Example 1 in an argon flow at 1100° C. for five hours.

Figure 5:
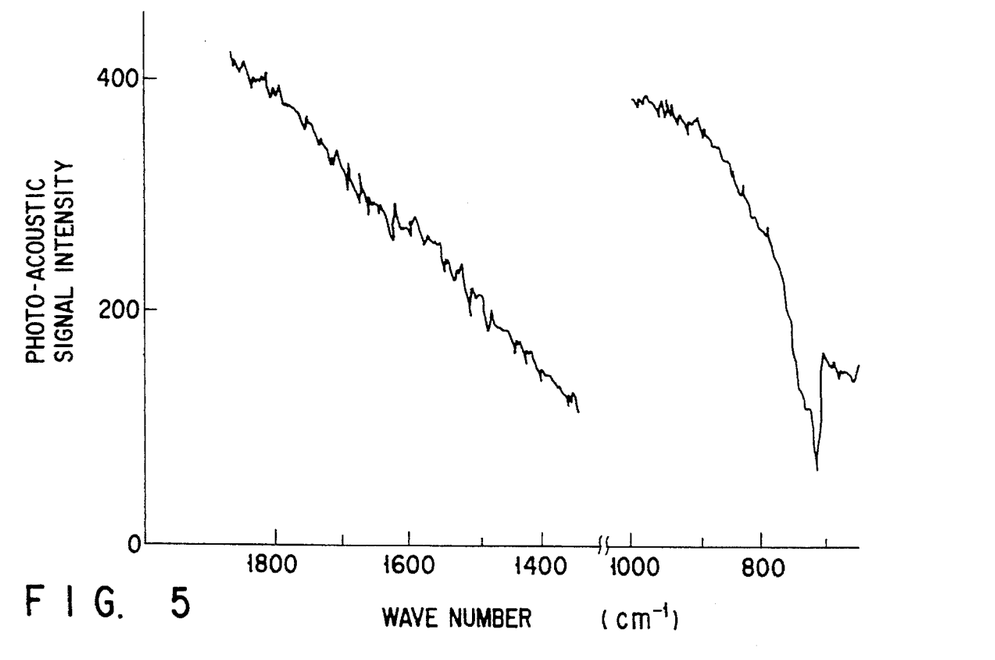
FIG. 5 is a graph showing the photo-acoustic spectrum of a polymeric material in Comparative Example 1.

The photo-acoustic spectrum of the obtained polymeric material was measured by infrared spectroscopy. Consequently, the photo-acoustic spectrum shown in FIG. 5 was obtained. It was confirmed from FIG. 5 that the polymeric material had neither an aromatic ring vibrational peak nor an aromatic CH bending vibrational peak. Also, no peaks derived from aromatic ring were detected by $C_{13}$MASNMR analysis. Furthermore, the polymeric material was found to have an element ratio (H/C) of hydrogen to carbon of 0.02 or less as measured by elemental analysis.

Following the same procedures as in Example 1, a negative electrode was manufactured by using particles formed by milling the above polymeric material and having a mean particle size of 6 μm. A cylindrical lithium secondary battery as illustrated in FIG. 1 was assembled following the same procedures as in Example 1 except that this negative electrode was used.

Comparative Example 2

Coal tar pitch identical with that in Example 6 was heat-treated in an argon flow at 400° C. for ten hours. Thereafter, the resultant material was heat-treated in an argon flow at 1100° C. for five hours to yield a polymeric material.

The photo-acoustic spectrum of the obtained polymeric material was measured by infrared spectroscopy, and $C_{13}$MASNMR analysis was also performed for the polymeric material. Consequently, no peaks derived from a aromatic ring were detected. Also, the polymeric material was found to have an element ratio (H/C) of hydrogen to carbon of 0.03 or less as measured by elemental analysis.

Following the same procedures as in Example 1, a negative electrode was manufactured by using particles formed by milling the above polymeric material and having a mean particle size of 20 μm. A cylindrical lithium secondary battery as illustrated in FIG. 1 was assembled following the same procedures as in Example 1 except that this negative electrode was used.

The lithium secondary batteries of Examples 1 to 7 of the present invention and Comparative Examples 1 and 2 were repeatedly charged and discharged such that each battery was charged to 4.2 V with a charge current of 50 mA and then discharged to 2.5 V with a 50-mA current, and the discharge capacities for negative electrodes at the first cycle and at the 30th cycle of each battery were measured. The results are summarized in Table 1 below.

TABLE 1

| | Heat-treatment temperature (deaeration temperature) (°C.) | Discharge capacity (mAh/q) | | |
|---|---|---|---|---|
| | | At the 1st cycle | At the 10th cycle | At the 30th cycle |
| Example 1 | 550 | 650 | 380 | 360 |
| Example 2 | 650 | 550 | 420 | 420 |
| Example 3 | 530 (550) | 680 | 475 | 475 |
| Example 4 | 700 | 500 | 405 | 380 |
| Example 5 | 600 | 645 | 420 | 415 |
| Example 6 | 650 | 560 | 415 | 415 |
| Example 7 | 400 (600) | 655 | 460 | 460 |
| Comparative Example 1 | 1100 | 310 | 250 | 250 |
| Comparative Example 2 | 1100 | 350 | 300 | 295 |

Note: The temperature in parentheses indicates the deaeration temperature after the treatment using concentrated sulfuric acid.

As is apparent from Table 1, the lithium secondary batteries of Examples 1 to 7 have excellently large discharge capacities after the 30th cycle.

It is also evident from Table 1 that the secondary batteries of Examples 2, 3, and 5 to 7 each having a negative electrode containing the polymeric material which is a polymer having a structure represented by formula (II) as a repeating unit in each of the X and Y directions, and which has one aromatic ring vibrational peak with a half-width of 50 cm$^{-1}$ or more at 1500 to 1700 cm$^{-1}$ in infrared spectroscopy and two aromatic CH bending vibrational peaks at 700 to 950 cm$^{-1}$ and also has a peak derived from aromatic ring at 100 to 150 ppm in a solid-state $C_{13}$NMR spectrum, cyclically have large capacities as compared with the secondary batteries of Examples 1 and 4.

The secondary batteries of Examples 2 and 3 include negative electrodes containing polymeric materials formed by performing dehydrogenation condensation for identical materials by different methods. Likewise, the secondary batteries of Examples 6 and 7 include negative electrodes containing polymeric materials formed by performing dehydrogenation condensation for identical materials by different methods. Of these secondary batteries, the secondary batteries (Examples 3 and 7) including negative electrodes containing polymeric materials which were dehydrocondensed with concentrated sulfuric acid have larger capacities than those of the secondary batteries (Examples 2 and 6) including negative electrodes containing polymeric materials which were dehydrocondensed with heat-treatment. The reason for this is assumed that, in dehydrogenation condensation performed by heat-treating, carbonization occurs simultaneously with the dehydrogenation condensation at the heat-treatment temperature (600 to 800° C.), and so the number of aromatic rings which absorb and desorb lithium ions decreases. On the other hand, in the treatment using concentrated sulfuric acid, the temperature of dehydrogenation is 200° C. or less, the deaeration temperature is lower than that in the dehydrogenation condensation by heat-treating, and the degree of carbonization is also small. It is considered, for the above reasons, that a secondary battery including a negative electrode containing a dehydrogenation condensation product (polymeric material) formed by the treatment using concentrated sulfuric acid has a larger capacity than that of a secondary battery including a negative electrode containing a dehydrogenation condensation product formed by the heat-treatment.

In contrast to the secondary batteries of Examples 1 to 7 as discussed above, the secondary batteries of Comparative Examples 1 and 2 using completely carbonized polymeric materials as the negative electrode materials have as small capacities as those of secondary batteries using conventional carbonaceous materials as negative electrode materials, although their cycle characteristics are good.

Note that the present invention is applied to cylindrical lithium secondary batteries in the above examples. However, the present invention is similarly applicable to rectangular lithium secondary batteries. In addition, the shape of the electrode group to be accommodated in the battery case is not limited to the spiral shape. As an example, the electrode group can be formed by laminating a plurality of layered structures in each of which the positive electrode, the separator, and the negative electrode are stacked in this order.

As has been discussed above, the present invention can provide a lithium secondary battery with a large capacity and a long cycle life.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lithium secondary battery comprising:
   a case;
   a negative electrode accommodated in said case and containing a polymeric material which absorbs and desorbs lithium ions and which has been formed by heat-treating a polymer in a non-oxidizing atmosphere at 500° to 1000° C., the polymer having as a main repeating unit a structure represented by formula (I) below:

wherein $R^1$ to $R^4$ may be the same or different and represent hydrogen, an alkyl group, a phenyl group, or a naphthyl group;
   a positive electrode accommodated in said case and so arranged as to oppose said negative electrode with a separator sandwiched therebetween; and
   a nonaqueous electrolyte contained in said case.

2. The secondary battery according to claim 1, wherein all of $R^1$ to $R^4$ in formula (I) are hydrogen.

3. The secondary battery according to claim 1, wherein said polymeric material has a specific surface area not more than 500 m$^2$/g.

4. The secondary battery according to claim 1, wherein said polymeric material has a density of 1.0 to 1.9 g/cm$^3$.

5. The secondary battery according to claim 1, wherein said polymeric material is contained in said negative electrode in the form of particles or fibers.

6. The secondary battery according to claim 1, wherein said positive electrode contains lithium-cobalt oxide or lithium-nickel oxide as an active material.

7. The secondary battery according to claim 1, wherein said nonaqueous electrolyte has a composition prepared by dissolving lithium hexafluorophosphate (LiPF$_6$) as an electrolyte in a solvent mixture of ethylenecarbonate and at least one nonaqueous solvent selected from the group consisting of propylenecarbonate, 2-methyltetrahydrofuran, and 1,2-dimethoxyethane.

8. A lithium secondary battery comprising:

a case;

a negative electrode accommodated in said case and containing a polymeric material which absorbs and releases lithium ions and which comprises a heat-treated material of polymer having as a main repeating unit a structure represented by formula (I) below:

(I)

wherein R$^1$ to R$^4$ may be the same or different and represent hydrogen, an alkyl group, a phenyl group, or a naphthyl group, and having one aromatic ring vibrational peak at 1500 to 1700 cm$^{-1}$ in infrared photo-acoustic spectroscopy and a peak derived from aromatic ring at 100 to 150 ppm in a solid-state C$_{13}$NMR spectrum;

a positive electrode accommodated in said case and so arranged as to oppose said negative electrode with a separator sandwiched therebetween; and a nonaqueous electrolyte contained in said case.

9. The secondary battery according to claim 8, wherein said polymeric material has one aromatic ring vibrational peak with a half-width of not less than 50 cm$^{-1}$ at 1500 to 1700 cm$^{-1}$ in infrared photo-acoustic spectroscopy.

10. The secondary battery according to claim 8, wherein said polymeric material has a composition in which all of R$^1$ to R$^4$ in formula (II) are hydrogen, has three aromatic CH bending vibrational peaks at 700 to 950 cm$^{-1}$ in infrared photo-acoustic spectroscopy, and has an element ratio (H/C) of hydrogen to carbon of not more than 0.35.

11. The secondary battery according to claim 8, wherein said polymeric material has a specific surface area not more than 500 m$^2$/g.

12. The secondary battery according to claim 8, wherein said polymeric material has a density of 1.0 to 1.9 g/cm$^3$.

13. The secondary battery according to claim 8, wherein said polymeric material is contained in said negative electrode in the form of particles or fibers.

14. The secondary battery according to claim 8, wherein said positive electrode contains lithium-cobalt oxide or lithium-nickel oxide as an active material.

15. The secondary battery according to claim 8, wherein said nonaqueous electrolyte has a composition prepared by dissolving lithium hexafluorophosphate (LiPF$_6$) as an electrolyte in a solvent mixture of ethylenecarbonate and at least one nonaqueous solvent selected from the group consisting of propylenecarbonate, 2-methyltetrahydrofuran, and 1,2-dimethoxyethane.

16. A lithium secondary battery comprising:

a case;

a negative electrode accommodated in said case and containing a polymeric material which absorbs and desorbs lithium ions, and which comprises a polymer having a structure represented by formula (II) below (II)

as a repeating unit in each of X and Y directions such that the repeating unit in the X direction is equal to or larger than the repeating unit in the Y direction wherein said polymeric material has one aromatic ring vibrational peak at 1500 to 1700 cm$^{-1}$ in infrared photo-acoustic spectroscopy and has a peak derived from aromatic ring at 100 to 150 ppm in a silid-state C$_{13}$NMR spectrum;

a positive electrode accommodated in said case and so arranged as to oppose said negative electrode with a separator sandwiched therebetween; and a nonaqueous electrolyte contained in said case.

17. The secondary battery according to claim 16, wherein said polymeric material has one aromatic ring vibrational peak with a half-width of not less than 50 cm$^{-1}$ at 1500 to 1700 cm$^{-1}$ in infrared photo-acoustic spectroscopy.

18. The secondary battery according to claim 16, wherein said polymeric material has two aromatic CH bending vibrational peaks at 700 to 950 cm$^{-1}$ in infrared photo-acoustic spectroscopy.

19. The secondary battery according to claim 16, wherein said polymeric material has a specific surface area not more than 500 m$^2$/g.

20. The secondary battery according to claim 16, wherein said polymeric material has a density of 1.0 to 1.9 g/cm$^3$.

21. The secondary battery according to claim 16, wherein said polymeric material is contained in said negative electrode in the form of particles or fibers.

22. The secondary battery according to claim 16, wherein said positive electrode contains lithium-cobalt oxide or lithium-nickel oxide as an active material.

23. The secondary battery according to claim 16, wherein said nonaqueous electrolyte has a composition prepared by dissolving lithium hexafluorophosphate (LiPF$_6$) as an electrolyte in a solvent mixture of ethylenecarbonate and at least one nonaqueous solvent selected from the group consisting of propylenecarbonate, 2-methyltetrahydrofuran, and 1,2-dimethoxyethane.

* * * * *